United States Patent
Whitla

[15] 3,647,165
[45] Mar. 7, 1972

[54] AIRCRAFT COMPARTMENT AND MAGNETIC CONNECTING ASSEMBLY

[72] Inventor: James Whitla, Tujunga, Calif.
[73] Assignee: Lockheed Aircraft Corporation, Burbank, Calif.
[22] Filed: Apr. 27, 1970
[21] Appl. No.: 32,042

[52] U.S. Cl. .......................244/118 P, 292/251.5, 335/290
[51] Int. Cl. .............................................B64d 13/00
[58] Field of Search ...............244/118; 292/251.5; 335/285, 335/290

[56] References Cited

UNITED STATES PATENTS

| | | | |
|---|---|---|---|
| 2,584,480 | 2/1952 | Manting | 292/251.5 |
| 3,330,506 | 7/1967 | Robillard et al. | 244/118 P |
| R23,636 | 3/1953 | Mark et al. | 292/251.5 |

*Primary Examiner*—Milton Buchler
*Assistant Examiner*—Steven W. Weinrieb
*Attorney*—Frank L. Zugelter and George C. Sullivan

[57] ABSTRACT

A magnetic connector assembly combined with an oxygen-mask carrying compartment mounted overhead of an aircraft cabin passenger's seat for automatic release of oxygen-mask equipment from the compartment to a passenger upon emergency or depressurization of the cabin. An electromagnet carrying spaced poles is securely mounted interiorly of the compartment by means of an adjustable bracket abutting a first wall's edge associated with and opposing the closing edge of the compartment's door. A permanent magnet is securely mounted on the inner side of the door adjacent its closing edge and is cooperatively disposed in relation to said poles. Energization of the core of the electromagnet repels the magnet from the cooperating spaced poles, thereby swinging open in a downward fashion the door upon hinging supports for dropping of the oxygen-mask into the lap of a passenger. The particular arrangement and orientation of the magnetic connector assembly in the aircraft concentrates and restricts its magnetic flux to at least one vertical plane normal to a horizontal plane in which the aircraft is travelling, thus eliminating interference with normal horizontal deviations of the aircraft's navigational compass.

1 Claims, 5 Drawing Figures

PATENTED MAR 7 1972 3,647,165

JAMES WHITLA
  INVENTOR.

BY  George C Sullivan
          Agent

Frank L. Zugelter
          Attorney

JAMES WHITLA
INVENTOR.

AIRCRAFT COMPARTMENT AND MAGNETIC CONNECTING ASSEMBLY

BACKGROUND OF THE INVENTION

1. Field of the Invention

The field of art to which the invention is most likely to pertain is located in a class of devices generally relating to mechanisms. Class 335, Electricity, Magnetically Operated Switches, Magnets and Electromagnets, and Class 292, Closure Fasteners, U.S. Patent Office Classification, may be the applicable general area of art in which the claimed subject matter of the type involved here may be classified.

2. Description of the Prior Art

Examples of prior art devices in arts to which this invention most likely pertains are U.S. Letters Pat. Nos. 2,253,252; 2,888,290; 3,111,607; 3,232,654; and Re. 23,636.

SUMMARY OF THE INVENTION

This invention generally relates to oxygen-mask stowage compartment devices used in pressurized aircraft cabins, and in particular is directed to such a device providing for positive connection of its door when in closed condition during nonuse of oxygen-mask equipment and instantaneous opening thereof when required, such as in an emergency or upon a sudden depressurization of the cabin.

In the operation of passenger aircraft at high altitudes, pressurization of its cabin is required for the safety, health and welfare of passengers, and under normal operating modes, main sources on the aircraft for pressurizing the cabin in its entirety help to provide for such conditions. However, in the event such pressurization is suddenly increased, such as by a sudden altitude drop, or by leakage in the fuselage by which the pressurized air is reduced, it is the present practice to drop an individual oxygen-mask unit from overhead of a passenger's seat to such passenger so that he can connect such unit to his nose and mouth for continuation of regular breathing without injuring his well being. These conventional units are operated by main sources as are or auxiliary sources required by governmental regulations safeguarding the passengers.

Existing apparata utilize gas (oxygen) under pressure as the activating power source for opening an oxygen-mask compartment. They require moving parts, an example of which is mechanical latches such as disclosed in U.S. Pat. No. 3,330,506. Attendant manufacturing tooling, assembly costs, quality control procedures for meeting government requirements and regulations, in-service maintenance and reliability penalties are important factors determining the final type and design of such mechanical latches. A disadvantage found in mechanical systems for controlling the condition of a compartment device, housing an oxygen-mask unit, is chatter of moving parts which occurs as a result of environmental vibration.

An object of this invention is to provide for absence of moving parts in the novel combination disclosed herein and elimination of servicing of the closing mechanism for the compartment device.

A further object of the invention is to provide for elimination of interference with normal horizontal deviations in an aircaft's navigational compass by a particular arrangement of the magnetic connector assembly in the compartment and orientation of the combination in the aircraft cabin. Such arrangement and orientation overcomes the disadvantage that otherwise results from generating magnetic and electric fields in an aircraft other than those associated with its operational equipment.

Other objects of the invention are to provide for low power consumption, and to provide for lightness in weight.

Another object of the invention is to provide a device production and cost thereof being simple and inexpensive while achieving a high degree of efficiency in the assembled and installed device.

These and other objects and advantages will become apparent from a reading of the following description, appended claims and accompanying drawing.

DESCRIPTION OF THE PREFERRED EMBODIMENT OF THE INVENTION

Figure 1:
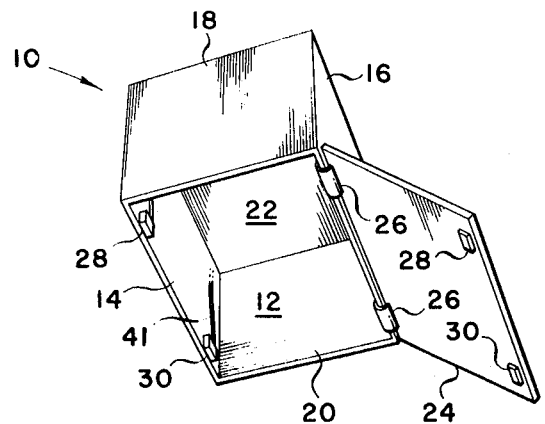
FIG. 1 is a perspective view of an overhead compartment, in open condition, for utilization of oxygen-mask equipment, and which illustrates the arrangement and orientation of an embodiment of the invention.

Referring now to the drawing in which like reference characters correspond to like numerals hereinafter, numeral 10 refers generally to a combination of an oxygen-mask compartment and magnetic connector assembly particularly arranged and oriented in an aircraft (not shown). The combination 10 comprises a compartment 12 for storage of oxygen-mask equipment, and is formed, preferably in a rectangular configuration, by means of spaced walls 14, 16 connected together by end walls 18, 20 and a base 22. A door member 24 is hingedly supported as at 26 along the edge of and to wall 16. Magnetic connector assemblies 28, 30 include portions respectively securely mounted on the inner face 32 (FIG. 2) of wall 14 and on the inner side 34 (FIG. 3) of door member 24. Compartment 12 and door member 24 are preferably formed from lightweight, one-piece plastic materials for reducing overall weight of the aircraft, as a great number of them are required in a single passenger aircraft, and their respective configurations may be molded by any conventional or known method. The securement of compartment 12 in overhead position to a passenger's seat is performed in accordance with acceptable practice in the aircraft industry. Such material and manner of securement does not form part of this disclosure, however, orientation thereof is an important aspect as will appear hereinafter.

A plurality of two hinging support means shown at 26 in FIG. 1 provides for swinging connection of door member 24 to compartment 12 so that upon its closing corresponding portions of each of magnetic connector assemblies 28, 30 engage each other in abutting relationship for maintaining closure of compartment 12. Means 26 is preferably of a biased or spring-loaded hinge type to afford swiftness of mechanical downward swing of door member 24 upon opening of compartment 12.

Figure 2:
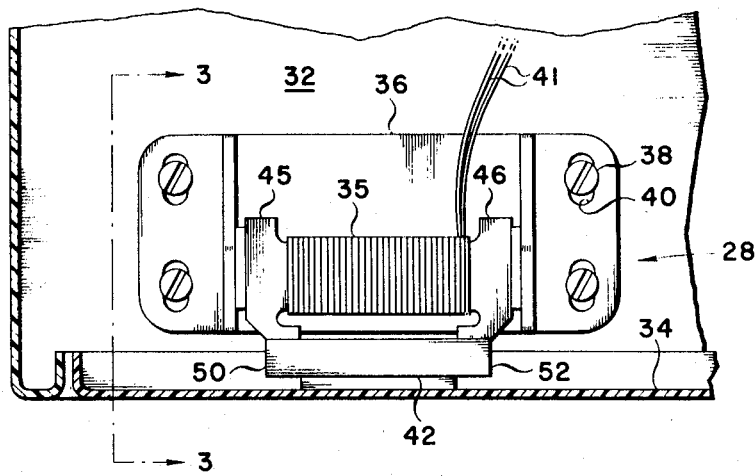
FIG. 2 is a front elevational view of an embodiment embodying the invention.
Figure 3:
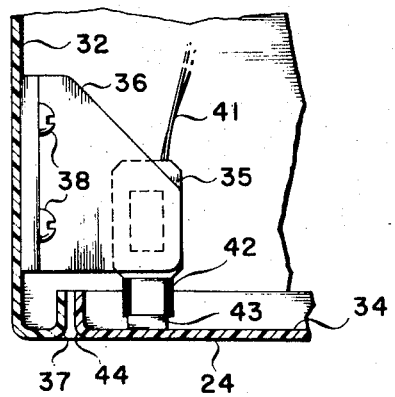
FIG. 3 is a view taken on line 3—3 of FIG. 2.

Magnetic connector assembly 28 (FIGS. 1, 2) comprises a straight-lined configurated and short lengthed electromagnet 35 suitably seated and supported on a bracket member 36 adjustably securable to inner face 32 adjacent edge 37 of wall 14 by means of screws 38 or the like fitted to their respective slots 40 provided in bracket member 36 for adjusting it on wall 14 in relation to the portion of assembly 28 mounted on door 24 and more fully described hereinafter. Electrical lead wires 41 constituting means for energizing electromagnet 35 are attached to electromagnet 35 and are connected to a source of current and voltage (not shown) carried by the aircraft. A firm flat pad of magnetical material 42, preferably constituting a permanent magnet, is suitably secured, such as by an appropriate bracket 43 or the like, generally shown in FIG. 3, to inner side 34 adjacent edge 44 of door 24 and abutting wall edge 37 in closed condition of compartment 12, and is mounted thereto for cooperative relation with electromagnet 35 as shown in FIGS. 2 and 3. The permanent magnet is preferably fabricated from ceramic material, although known metallic magnetic materials such as alnico or a samarium-cobalt base material may also be employed.

For clarity of disclosure and ease of reading, the following description appears in terms applied to magnetic connector assembly 28, however, it should be understood that such description applies equally as well to assembly 30 as these assemblies are duplicates of each other.

As will be observed in FIG. 2, in the closed condition for compartment 12, two short linear magnetic pole pieces 45, 46 are physically attached to and disposed on the opposite ends of the iron or metallic body core or armature of electromagnet 35, with a planar face on the other end of each such piece 45, 56 to physically engage or contact their respective, cooperating pole end 50, 52 of magnet 42. Each linear pole piece 45, 46 extends along wall 14 towards door member 24 in its closed position. The pole pieces of magnet 42 (shown in black in FIG. 3) exert a restricting influence on the disposition of the magnetic flux. The magnetic field of or induced in magnet 42 is closed by such ends of such armature, and it should be observed that in the orientation and arrangement of each assembly 28, 30 in compartment 10, in respect to the aircraft and navigational compass, this closed field of flux lies substantially in one or both vertical planes to the horizontal plane in which latter direction flight of the aircraft takes place, shown by the arrow in FIG. 2. These vertical planes are normal to the horizontal plane in which natural deviations of the aircraft's navigational compass occur and with which any potential interference from other locations on or in the aircraft must be eliminated, remembering that the total number of compartments 12 and assemblies 28, 30 is potentially several hundred for each aircraft.

A distinct advantage in this arrangement and orientation of combination 10 is that such horizontal deviations are not materially affected, since utilization of poles 45, 46 closes each magnetic field generated by the cooperation relationship of poles 45, 46 and permanent magnet 42, and concentrates and restricts the magnetic flux of each permanent magnet 42, 50 to one or both vertical planes, thus eliminating potential interference with the necessary operation of the aircraft's navigational compass so vitally important in present space travel. Such compass naturally deviates with respect to magnetic north in a horizontal plane perpendicular to the planes encompassing such magnetic flux.

Figure 4:
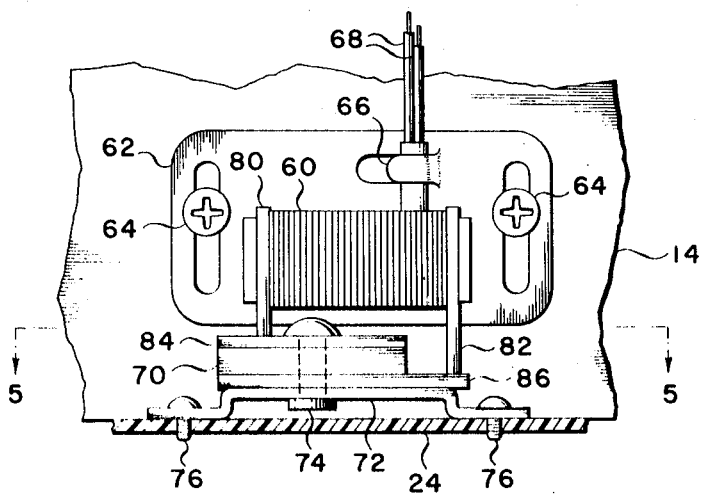
FIG. 4 is a front elevational view of another embodiment of a magnetic connector assembly mounted in such compartment and embodying the invention.
Figure 5:
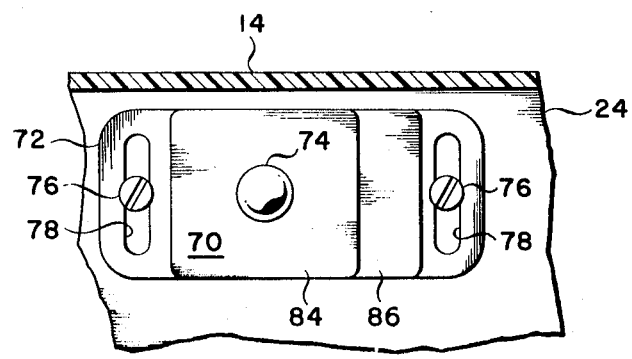
FIG. 5 is a view taken on line 5—5 of FIG. 4.

Another embodiment of the invention is illustrated in FIGS. 4 and 5. An electromagnet 60 is supported by a suitable bracket member 62 secured to wall 14 by screw and slot means 64, with a lug 66 stamped out of bracket member 62 for holding in place electrical leads 68 to electromagnet 60 to energize it. A permanent magnet 70 is securely seated on a door bracket 72 by means of bolt-nut means 74, while bracket 72 is held in place on a door 24 by screws 76 which is disposed in slots 78 of bracket 72 providing for adjustment of the respective portions of this embodiment between each other. Pole pieces 80, 82 are suitably mounted upon the ends of electromagnet 60 to physically engage 1010 steel sheets 84, 86, respectively, secured by bolt-nut means 74 to permanent magnet 70. 1010 sheet 86 extends beyond the coextensive lengths of magnet 70 and 1010 sheet 84 in order that pole 82 cooperatively relates thereto in the same manner as pole 80 and 1010 sheet 84 cooperatively relate. It should be clear that the wall and door portions of the magnetic connector assembly disclosed in FIGS. 4 and 5 are adjustable with respect to each other by means of screw-slot means 64, 76 and 78 in order that a positive connection is made between electromagnet 60 and permanent magnet 70 for placing compartment 12 in closed condition.

In operation, the poles of the permanent magnet attract the respective abutting poles of the electromagnet, which, of course, are opposite in sense for such attraction. Compartment 12 is in closed position under these conditions. Upon application of or the command by an electrical impulse or signal through leads 41, 68 to electromagnet 35, 60, the latter is energized, causing reversal of its polarity in relation to the permanent magnet poles. The attraction such poles had for their corresponding poles of the permanent magnet turns into repulsion, and door 24 immediately swings open on its spring-loaded hinges 26, thereby providing for instant exposure and dropping of oxygen-mask equipment to a passenger seated directly below. A conventionally known aneroid altitude switch (not shown) is an example of a method to trigger the circuit including leads 41, 68.

It should now be apparent that the arrangement of each combination 10, assemblies 28, 30 in respect to the aircraft and navigational compass provides for a proper orientation of magnetic fields which are generated by the cooperative action of an electromagnet having poles and a permanent magnet and lying in one or two planes perpendicular to a horizontal plane passing through the aircraft. Such fields are closed when compartment 12 is closed, and open when door 24 is open. Regardless of the quantity of such combinations being utilized on a passenger aircraft, in no way do the many developed magnetic fields materially affect the aircraft's navigational compass. The total effect of an otherwise unrestricted magnetic system could be dangerous to proper flight controls and, ultimately, to the well being of all persons aboard.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practised otherwise than as specifically described and exemplified therein, by those skilled in the art, and having the benefit of this disclosure.

I claim:

1. An aircraft having a compartment for stowage of equipment, said compartment comprising first and second walls in opposed spaced relationship to each other and in longitudinal relationship to said aircraft, a door member providing a closed and open condition for said compartment swingably connected to the second of said walls for swinging movement toward and way from the first of said walls, and at least one connector assembly for positively connecting said door member to the first of said walls, said assembly comprising:
   1. a short straight-lined configurated electromagnet securely mounted to the first of said walls,
   2. a pair of short linear pole pieces one end of each being physically attached to a respective end of said electromagnet and each having a planar face at its other end adapted for physical contact with a pole end of a magnetical element, each of said linear pole pieces extending along the first of said walls and towards said door member in its closed position relative to said first wall,
   3. a magnetical member secured to said door member the poles in its ends cooperatively acting with said pair of linear pole pieces when said door member is in its closed position, and means for energizing said electromagnet, said electromagnet and magnetical member being oriented when cooperatively acting with each other such that the magnetic flux of the magnetic system developed by said assembly lies in at least one of the planes normal to the horizontal plane through which the aircraft is traveling, substantially all the strength of such magnetic flux being concentrated or restricted to such normal plane or planes.

* * * * *